United States Patent [19]

Schneider

[11] Patent Number: 5,196,698

[45] Date of Patent: Mar. 23, 1993

[54] METHOD AND APPARATUS FOR NUCLEAR LOGGING USING LITHIUM DETECTOR ASSEMBLIES

[75] Inventor: David M. Schneider, Cheshire, Conn.

[73] Assignee: Baker Hughes Corporation, Houston, Tex.

[21] Appl. No.: 786,728

[22] Filed: Nov. 1, 1991

[51] Int. Cl.$^5$ ............................................... G01V 5/10
[52] U.S. Cl. ................................... 250/262; 250/269; 364/422
[58] Field of Search ................. 364/422; 250/262, 269

[56] References Cited

U.S. PATENT DOCUMENTS

| | | | |
|---|---|---|---|
| 3,940,610 | 2/1976 | Dennis et al. | 250/253 |
| 4,136,278 | 1/1979 | Oliver | 250/269 |
| 4,271,356 | 6/1981 | Groeschel et al. | 250/262 |
| 4,379,229 | 4/1983 | Givens | 250/269 |
| 4,587,424 | 5/1986 | Grau | 250/262 |

*Primary Examiner*—Carolyn E. Fields
*Attorney, Agent, or Firm*—Fishman, Dionne & Cantor

[57] ABSTRACT

A method and apparatus for nuclear logging, and in particular, neutron porosity logging is presented. In accordance with the present invention, a pair of spaced lithium detectors, preferably $Li^6I$ crystal or $Li^6$ doped glass are used to detect neutrons emitted from a borehole formation being logged. In addition, novel data processing is used to determine the neutron count from the spectrum developed by the lithium detectors. This novel data processing comprises fitting a Gaussian curve to the neutron peak of the spectrum. The Gaussian curve does not include the hydrogen absorption peak of the spectrum. The area under this Gaussian curve represents the neutron count. Accordingly, a more accurate neutron count is obtained which does not include gamma rays attributed to hydrogen absorption.

21 Claims, 4 Drawing Sheets

FITTING OF GAUSSIAN CURVE TO NEUTRON PEAK

FITTING OF EXPONENTIAL FUNCTION TO GAMMA PEAK

SPECTRUM AFTER SUBTRACTION OF THE EXPONENTIAL FUNCTION

FITTING OF GAUSSIAN CURVE TO NEUTRON PEAK

METHOD AND APPARATUS FOR NUCLEAR LOGGING USING LITHIUM DETECTOR ASSEMBLIES

BACKGROUND OF THE INVENTION

This invention relates generally to borehole logging apparatus and methods for performing radiation based measurements. More particularly, this invention relates to a new and improved apparatus for effecting neutron porosity logging in real time wherein the improved nuclear logging apparatus comprises a measurement-while-drilling (MWD) tool.

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable (which is attached to some sort of mobile laboratory at the surface) is also the means by which information is sent up to the surface. It thus becomes possible to measure some parameter of the earth's formations as a function of depth, that is, while the sonde is being pulled uphole. Such measurements are normally done in real time (however, these measurements are taken long after the actual drilling has taken place).

A sonde usually contains some type of source (nuclear, acoustic, or electrical) which transmits energy into the formation as well as a suitable receiver for detecting the same energy returning from the formation. The present invention relates to logging apparatus wherein the source emits nuclear energy, and more particularly neutrons. When using this type of source, the source sends out "fast" (high energy) neutrons into the formation. The fast neutrons leaving the source enter the formation and slow down by losing energy as a result of collisions with the nuclei of the formation, finally becoming thermalized. By thermalized, it is meant that, on the average, the neutrons lose as much energy as they gain as a result of collisions, that is, they are in thermal equilibrium with the nuclei of the formation. After some time spent diffusing as thermal neutrons, they may be captured by one of the formation nuclei resulting in the emission of a gamma ray. The energy of the gamma ray emitted is characteristic of the particular nucleus involved. It is in this context that the term "thermal capture gamma ray spectra" is used. Examples of well logging tools of this type are disclosed in U.S. Pat. Nos. 3,379,882, 3,662,179, 4,122,338, 4,223,218, 4,224,516, 4,267,447, 4,292,518, 4,326,129 and 4,721,853.

Fast neutrons as a probe source are useful for several reasons. For example, chemical sources for the fast neutrons such as $Am^{241}Be$ and $Pu^{238}Be$ are readily available. Fast neutrons also have a reasonable degree of penetration into matter, and finally most importantly, neutrons can be especially useful for the detection of hydrogen. To understand the effect of hydrogen, it is helpful to use the analogy of a group of billiard balls in which the neutron and the hydrogen nucleus are balls having essentially the same mass while the nuclei of other elements in the formation are balls with much larger masses. Thus, if a neutron collides with the nucleus of an element other than hydrogen, it will generally lose very little energy. If it collides with a hydrogen nucleus, because the masses are nearly equal, it can lose all of its energy. The ability of a formation to slow down fast neutrons to thermal energy then depends primarily on the hydrogen density.

With regard to hydrogen density in a formation, two diametrically opposed situations may be considered. In the first situation, a group of fast neutrons leave a source and slow down in a formation free of hydrogen, and in a second situation, a group of fast neutrons leave a source and slow down in a formation which has a great deal of hydrogen in it. One expects and will find that the neutrons will have gone much farther away from the source in the first case than in the second case. As a result of the foregoing, a technique which has been in use in "wireline oil well logging" for more than thirty years is the measurement of the spatial distribution of slowed down neutrons. This technique is usually described as neutron porosity logging because the porosity of the formation is inferred from the measurement. Here it is tacitly assumed that the pores of the formation are filled with either water or oil (an assumption not always true since there may be gas or a mix of all three components). It is also assumed that the hydrogen density for oil and water are equal (that assumption is also not strictly true, but can be safely assumed for all practical purposes).

In order to construct a neutron porosity sonde which looks at the spatial distribution of slowed down neutrons, one needs a source of sufficient intensity (for example, $10^7$ neutrons/sec), and a detector separated from the source (for example, 15 inches). There needs further to be sufficient shielding between the source and detector to keep the radiation coming directly through the sonde to a minimum. Further features needed in the sonde involve reducing the response of the sonde to factors other than porosity, such as borehole size, salinity, etc. Evolution in the prior art of this type of sonde has consisted primarily in changes in the type of detector used. Originally, Geiger counters with heavy walls were used. These counters did not detect neutrons but rather gamma rays originating in the formation as a result of thermal neutron capture. The gamma rays strike the walls of the counter releasing photoelectrons which in turn cause ionization which can be detected by the counter. Although such detectors are very rugged, they suffer from the disadvantage of not directly counting the slowed down neutrons.

For a thermal or epithermal neutron detector placed at a sufficiently large distance, for example, 15 inches from the source, it can be shown that the count rate of the detector is of the form $A \exp(-r/L)$ where A is some constant which depends on the source-detector distance and the counting efficiency of the detector, r is the distance between source and detector, and L is some parameter which depends on the slowing down (of neutrons) properties of the formation, i.e., the porosity. For a formation containing no hydrogen, L will be relatively large as compared with a formation which is quite porous where L will be significantly smaller.

It is important to note that the transport of fast neutrons through a formation is characterized by three phases: (1) slowing down to thermal energy; (2) diffusion at thermal energy; and (3) capture by a formation nucleus accompanied by the emission of a characteristic gamma ray by the excited nucleus. Only the first phase gives information related directly to the Presence of hydrogen.

Since neutrons are not charged particles, their detection presents some special problems. The better detectors usually depend on the neutron undergoing some kind of nuclear reaction, one of whose products is in turn an ionizing particle such as an alpha particle. As a result of improvements in technology, the single detector neutron sonde using a heavy-walled Geiger counter was modified with the replacement of the Geiger counter by a $He^3$ proportional counter (normal He is $He^4$) $He^3$ has an unusually high capture cross section for thermal neutrons, and the reaction products (ionizing) are a proton and a triton ($H^3$). A proportional counter is used since it gives good discrimination against gamma rays.

The single $He^3$ detector neutron sonde (detecting epithermal neutrons) was thereafter replaced by a two detector neutron sonde (detecting thermal neutrons). The two detector sonde was viewed as being less sensitive to effects of borehole conditions. Thermal detection of neutrons was chosen because count rates were higher than with epithermal detection. In this development, the ratio of the count rates of the two detectors (near and far from the source) are determined. Instead of looking at the spatial distribution of neutrons, the rate of change of the spatial distribution is being observed. A further refinement of this technique is to look at the rate of change of the spatial distribution for epithermal neutrons.

The foregoing description of prior art nuclear formation logging device relates primarily to wire line devices wherein the formation evaluation is done after drilling is completed. More recently, a new generation of formation evaluation tools has been developed which evaluate the earth formation without interrupting the drilling of a borehole. These tools are known as measurement-while-drilling or MWD tools. A typical commercial MWD tool (such as is available from Teleco Oilfield Services, Inc., assignee of the present application) may measure such downhole conditions as the so-called weight-on-bit or "WOB" as well as the torque acting on the bit, the azimuth direction and the angle of inclination of the borehole, borehole temperature, mud resistivity and various characteristics of the earth formations penetrated by the bit. The output signals of the various sensors are coupled to circuits which selectively control a downhole pressure pulse signaler in the tool for successively transmitting and/or recording encoded data signals (i.e, pressure pulses) representative of these real-time measurements through the mud stream in the drill string to suitable detecting-and-recording apparatus at the surface.

It will, of course, be appreciated that MWD tools have been proposed heretofore for providing real-time measurements of different radioactivity characteristics of earth formations being penetrated by the drill bit. Since measurement of natural gamma radiation requires only a gamma ray detector and typical circuits to control the signaler, it has not been difficult to provide MWD tools with that instrumentation. Conversely, to measure other radioactivity characteristics of earth formations, a MWD tool must also have an appropriate source of radiation (e.g., radioactive chemical source) as described above. It is far more difficult to construct a MWD tool of this type (which includes a source of radiation). While such tools have been disclosed (for example, see U.S. Pat. Nos. 4,814,609 and 4,829,176), there is a continuing need for improved MWD tools for nuclear well logging which include nuclear sources.

An improved MWD nuclear well logging tool which addresses many of the problems of the prior art is disclosed in U.S. Application Ser. No. 710,822 filed Jun. 5, 1991, which is assigned to the assignee hereof and incorporated herein by reference. The MWD tool of USSN 710,822 comprises a two detector neutron tool. In accordance with an important feature of USSN 710,822, the detectors incorporate the $Li^6$ isotope of lithium (i.e., $Li^6I$ crystal or $Li^6$ doped glass). The reaction products resulting from a neutron interacting with $Li^6$ are an alpha particle and a triton. The lithium crystal or glass is fixed to the face of a photomultiplier tube and the light scintillations which occur therein as a result of neutrons interacting with the lithium are detected and the resultant signal is amplified by the photomultiplier. The lithium crystal or glass is wrapped with a reflective material to improve the light collection for the photomultiplier tube. These detector components are all appropriately packaged for reducing vibrational damage.

Heretofore, it has been generally accepted that lithium crystal or glass detectors were not practical for tools of this type because of problems associated with gamma ray discrimination. In the case of the $He^3$ proportional counter, the pulse heights from neutrons are usually an order of magnitude larger than those arising from gamma rays, making discrimination quite simple. For $Li^6I$ and $Li^6$ glass, the pulse heights from neutrons and gamma rays are comparable in magnitude. Of the two scintillators, $Li^6I$ is inherently more sensitive to gamma rays because of the presence of iodine which is a high Z (atomic number) material. Nonetheless, the choice of $Li^6$ glass does not remove the problem of gamma ray discrimination. However, in accordance with another important feature of USSN 710,822, gamma ray discrimination is accomplished using a novel data processing technique. Using this technique, after a spectrum of particle energies has been acquired, a microprocessor will fit a curve (e.g., an exponential curve) to the spectrum that approximates the portion of the spectrum contributed by the gamma rays. After the gamma characterization is done, the novel software then strips the gamma rays out of the raw spectrum. This is accomplished by subtracting the gamma ray spectrum from the raw spectrum. However, with large detectors a second peak is detected which is also attributed to gamma rays. This peak is the hydrogen absorption peak which is generally centered at about 2.2 MeV. Unfortunately, the gamma ray stripping technique of USSN 710,822 fails to remove this peak, thereby resulting in a neutron count which includes gamma rays attributed to hydrogen absorption. In turn, this leads to less than desired accuracy in the borehole logs derived from the neutron tool of USSN 710,822.

SUMMARY OF THE INVENTION

The above-discussed and other problems and deficiencies of the prior art are overcome or alleviated by the novel gamma ray stripping technique of this invention wherein a more accurate neutron count is obtained which does not include gamma rays attributed to hydrogen absorption. This is accomplished by fitting a Gaussian curve to the neutron peak. The Gaussian curve does not include the hydrogen absorption peak. The area under this Gaussian curve represents the neutron count. This calculation will produce a value whose units are neutrons per second. The method of determining neutron count of the present invention provides a significant improvement in accuracy over the technique of USSN 710,822.

This important gamma ray stripping and neutron counting software technique permits the practical use of lithium detectors, which as mentioned, have been previously thought to be problematic as a detector in a nuclear well logging tool.

The above-discussed and other features and advantages of the present invention will be appreciated and understood by those skilled in the art from the following detailed description and drawing.

DESCRIPTION OF THE DRAWINGS

Referring now to the drawings, wherein like elements are numbered- alike in the several FIGURES.

DESCRIPTION OF THE PREFERRED EMBODIMENT

Figures 1, 4B:
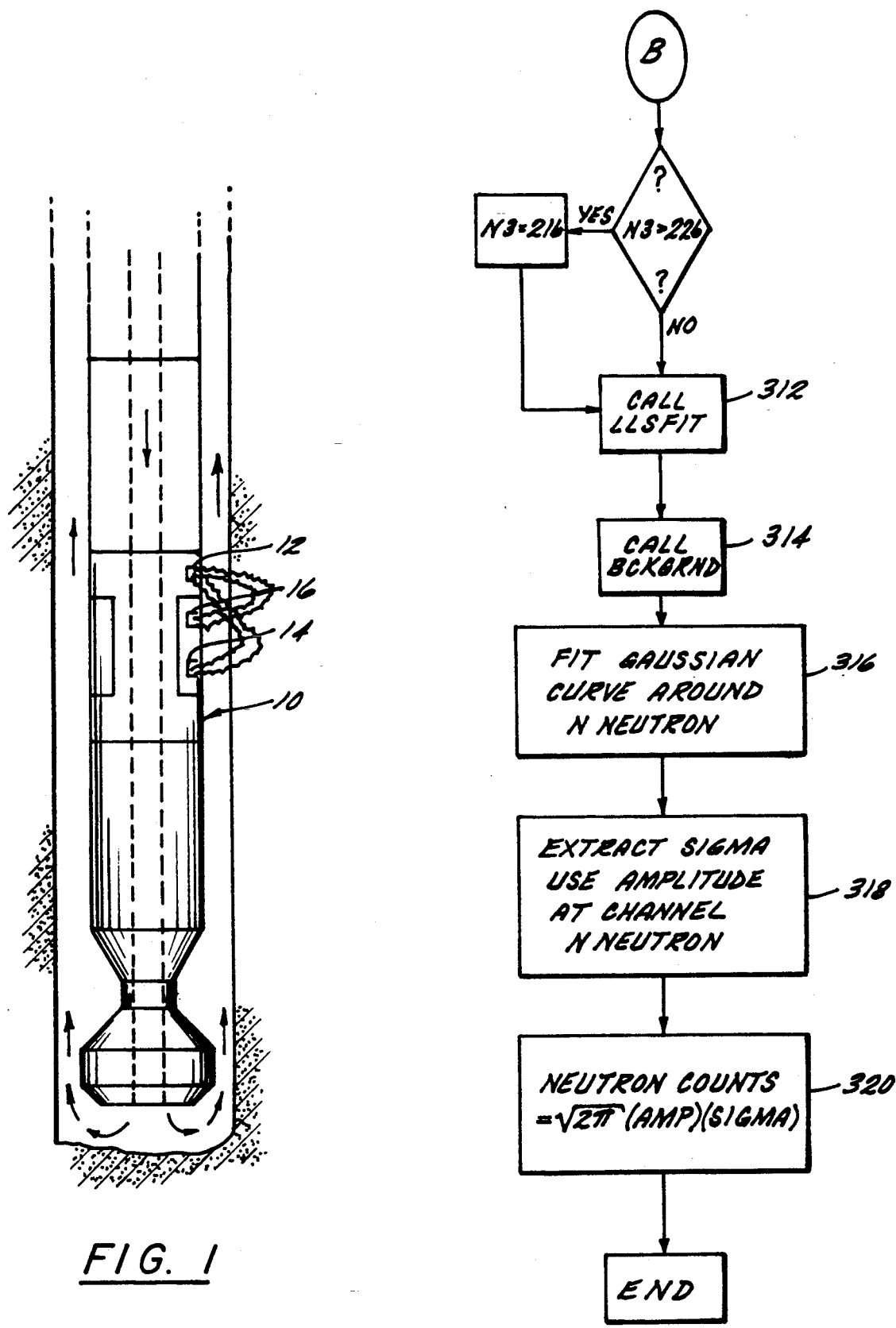
FIG. 1 is a diagrammatic view of a neutron porosity tool in accordance with the present invention.
FIG. 4A-B is a flow chart of the digital processing technique for determining neutron counts.

With the exception of the novel gamma ray stripping technique of this invention, the neutron tool employed herein is substantially as described in USSN 710,822, which has been incorporated herein by reference referring to FIG. 1, in general, the neutron tool 10 of this invention comprises a steel collar section (sub). Power and signal transmission is effected using a single power and signal bus (e.g., a wire) which runs the length of the tool. This power bus terminates at either end of the tool at a modular connector comprised of a conductive metal ring housed within an insulator. All components of the device are mounted in the sub collar wall including the radioactive source 12, detector assemblies 14 and 16 and all associated electronics. Three compartments or hatches (equipped with removable high pressure hatch covers) are provided inside the wall of the drill collar for receiving the tool electronics. A first hatch (known as the Detector Hatch) includes the near and far detector assemblies and a signal buffer board. A second hatch (known as the modular tool interface or MTI Hatch) contains a low voltage power supply (for powering the conventional electronic parts) and modem on a MTI board; and a high voltage power supply for powering the photomultipliers. A third hatch (known as the Processor Hatch) includes a multichannel analyzer and microprocessor for collecting and storing spectra over preselected time periods and then processing those spectra to obtain neutron counts and gamma counts.

The mounting of the detector units and other electronic components within the subwall under a removable high pressure hatch cover offers many advantages over prior art detector mounting methods including ease of installation and removal, accessibility for diagnosis and adjustment, close proximity of detectors to the outside of the tool and the actual formation wall and facilitates placement of shielding around the detectors.

The nuclear source is loaded in a novel nuclear source container which is compatible to the environment encountered in downhole MWD drilling and logging. The source container is a rugged unit designed to withstand stresses, pressures and temperatures experienced in downhole oil drilling. It houses a dimensionally small Nuclear Regulatory Commission (NRC) approved logging source and adapts it to large downhole hardware by means of a closely controlled diameter, length and thread. On the opposite end of the thread which secures it to the logging device is a novel bayonet which is configured to engage and lock the source assembly into the receptacle of a novel installation and removal tool. The shank of the threaded end is smaller and thus weaker than the bayonet end to ensure the successful removal of the source from the logging tool. This novel bayonet design also ensures that no person without compatible equipment will be able to handle the source; and that removal of the source will be fast and safe.

In accordance with still another feature of this invention, the centerline of the nuclear source is located orthogonal to the axis of the tool in a thick walled section of the tool so that the centerline of the active portion of the source is approximately in line with the axis of the detectors being used.

The electronics associated with the nuclear logging tool of this invention utilize multichannel analysis wherein the input comprises a train of analog pulses, each corresponding to the absorption of a neutron or gamma ray and wherein the amplified output is observed over a selected time interval and a pulse height distribution is constructed therefrom. The electronic processing circuitry includes at least two novel components, namely a programmable gain amplifier (PGA) and a high speed peak detector.

The primary feature of the PGA is that its gain can be varied and controlled digitally (using a digital bus). The PGA both amplifies detector pulses and modifies the frequency characteristics of signals that enter it. The PGA includes a low pass filter function which significantly improves the signal to noise ratio and preserves system resolution by limiting the high frequency signal content in each pulse. By limiting the high frequency signal content, pulse amplitudes are more easily quantified by the multichannel analysis (MCA) function thus resulting in better quality spectra.

The high speed peak detector receives the output from the PGA and is important as it converts a short, transient amplitude into a stable DC signal which can easily be measured with an A/D converter.

Figure 2:
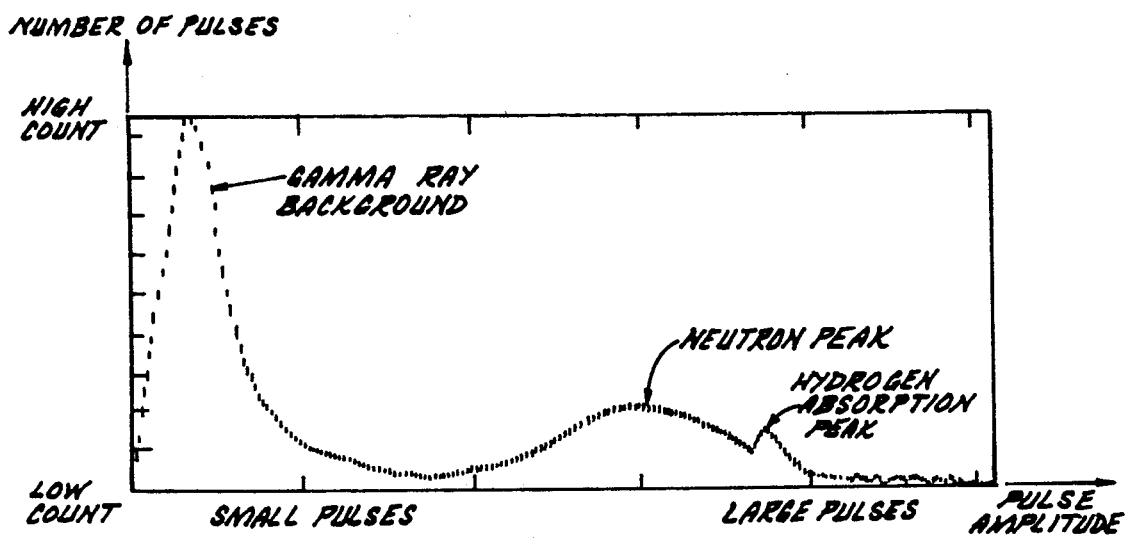
FIG. 2 is a typical spectrum for an $Li^6$ glass scintillator.

A typical spectrum for Li-6 glass is shown in FIG. 2. The vertical axis gives the quantity of pulses and the horizontal axis is proportional to the pulse amplitude. Examination of this spectrum shows that it depicts three parts, namely the gamma ray background, the neutron peak and the hydrogen absorption peak. The gamma ray portion and the hydrogen absorption peak occur because Li⁶ glass is also sensitive to gamma rays, which are always present in a neutron logging situation. The neutron peak is predominantly caused by thermal neutrons interacting with the glass scintillator.

Heretofore, it has been believed by those skilled in the art that Li⁶ glass (or other Li⁶ detectors) would be problematic in a logging measurement because of the difficulty of removing the gamma ray background and the hydrogen absorption peak. The present invention has overcome past practical problems by acquiring real time spectra and subjecting these spectra to digital processing techniques.

Figure 3A:
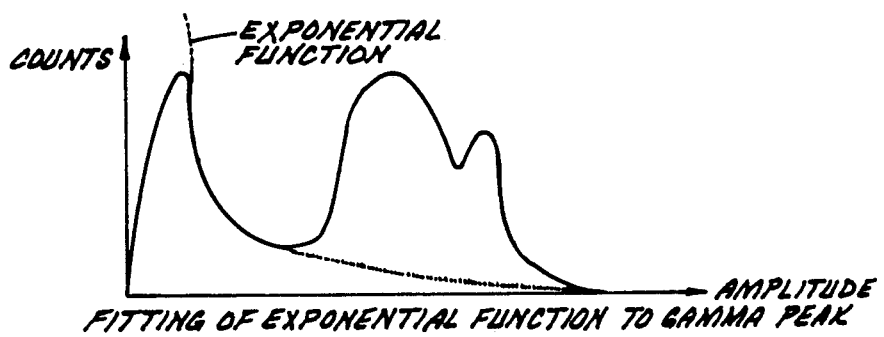
FIG. 3A is a graph depicting the fitting of an exponential function to the gamma ray portion of the spectrum of FIG. 1.
Figure 3B:
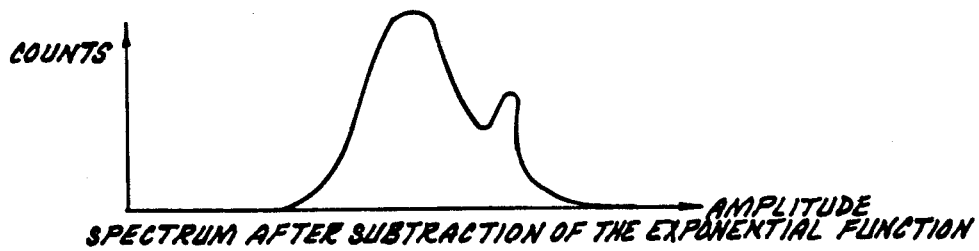
FIG. 3B is a graph depicting the spectrum of FIG. 1 subsequent to subtraction of the exponential function in accordance with the stripping technique of the present invention.

As will be discussed in greater detail below, after a spectrum has been acquired, a microprocessor will fit a curve (e.g., an exponential curve) to the spectrum so that it approximates the portion of the spectrum contributed by the gamma rays. A typical exponential function is shown superimposed on a raw spectrum in FIG. 3. After the gamma characterization is done, it becomes possible to strip the background gamma rays out of the raw spectrum. This is accomplished by subtracting the background gamma function from the raw spectrum. The result of this subtraction is shown in FIG. 3B. Note that the gamma ray background with the exception of the hydrogen absorption peak is now absent from the spectrum. A Gaussian curve is shown superimposed on the spectrum of FIG. 3B in FIG. 3C. It will be appreciated that this curve does not include the hydrogen absorption peak. The area under the curve represents the neutron count. This calculation will produce a value whose units are neutrons per second. It will be appreciated that while two detector assemblies are preferred, this invention may also be utilized in conjunction with one detector assembly or greater than two detector assemblies. Further, although an exponential curve is preferred for gamma ray background stripping, many other gamma ray stripping methods may be employed (e.g., curves based on a polynomial of an arbitrary number of terms).

Figure 3C:
FIG. 3C is a graph depicting the fitting of a Gaussian curve to the neutron ray portion of the spectrum of FIG. 2B.

As already mentioned, an important feature of this invention is the spectrum digital processing technique which results in the Gaussian curve of FIG. 3C. This processing technique and the associated software will now be described with respect to the flow chart of FIGS. 4A-B.

It will be recalled that the raw spectra of FIG. 2 must undergo data processing to achieve the stripped spectra of FIG. 3B. The data processing is composed of three parts. Part one involves smoothing the raw spectrum. In part two, the shape of the smoothed spectrum is characterized by its two peaks, a valley therebetween and a least squares fitting is used to produce the gamma ray background spectrum curve (FIG. 3A) which is subtracted from the original spectrum to yield the preliminary neutron spectrum (free of background gamma rays). In the third part, the neutron spectrum is analyzed statistically in order to modify it and yield as a final result the total neutron counts.

Part I. Using the SMOOTH routine, the raw spectrum (as in FIG. 2) is smoothed (at 300 in FIG. 4A) by passing an eleven point window successively through the histogram and averaging each set of eleven points. The process is then repeated for the purpose of further smoothing (at 302 in FIG. 4A). For example, if channels 1 through 11 are being averaged, the average value is inserted at channel 6 (the mid-point). The eleven channel window is then moved up one channel and channels 12 through 22 are averaged with the average being inserted at channel 17. This process is carried forward through the 256 channels. To obtain the smoothed value for channel zero, it is assumed that there are channels −1 through channel −5 which have the same value as channel zero and the window runs from channel −5 through channel +5. A similar procedure occurs at channel 256.

Part II. The spectrum having now been smoothed must be characterized according to its shape: its two peaks and the valley between them. The search for the gamma ray peak is performed using the PEAK routine (at 304 in FIG. 4A). Starting at channel 1, a search is performed using a ten channel window and finding the channel with the highest count in that window. The search is then repeated with the window shifted so that the first channel of the window corresponds to the channel with the highest count previously found. The process continues until the peak channel number does not change. The peak channel number is referred to as NGAMMA. With the determination of the gamma peak channel number, NGAMMA, an integration of the raw spectral curve from channel 2 though (2*NGAMMA) is performed to determine total background gamma counts. This value is a secondary measurement to the neutron count measurement.

Figure 4A:
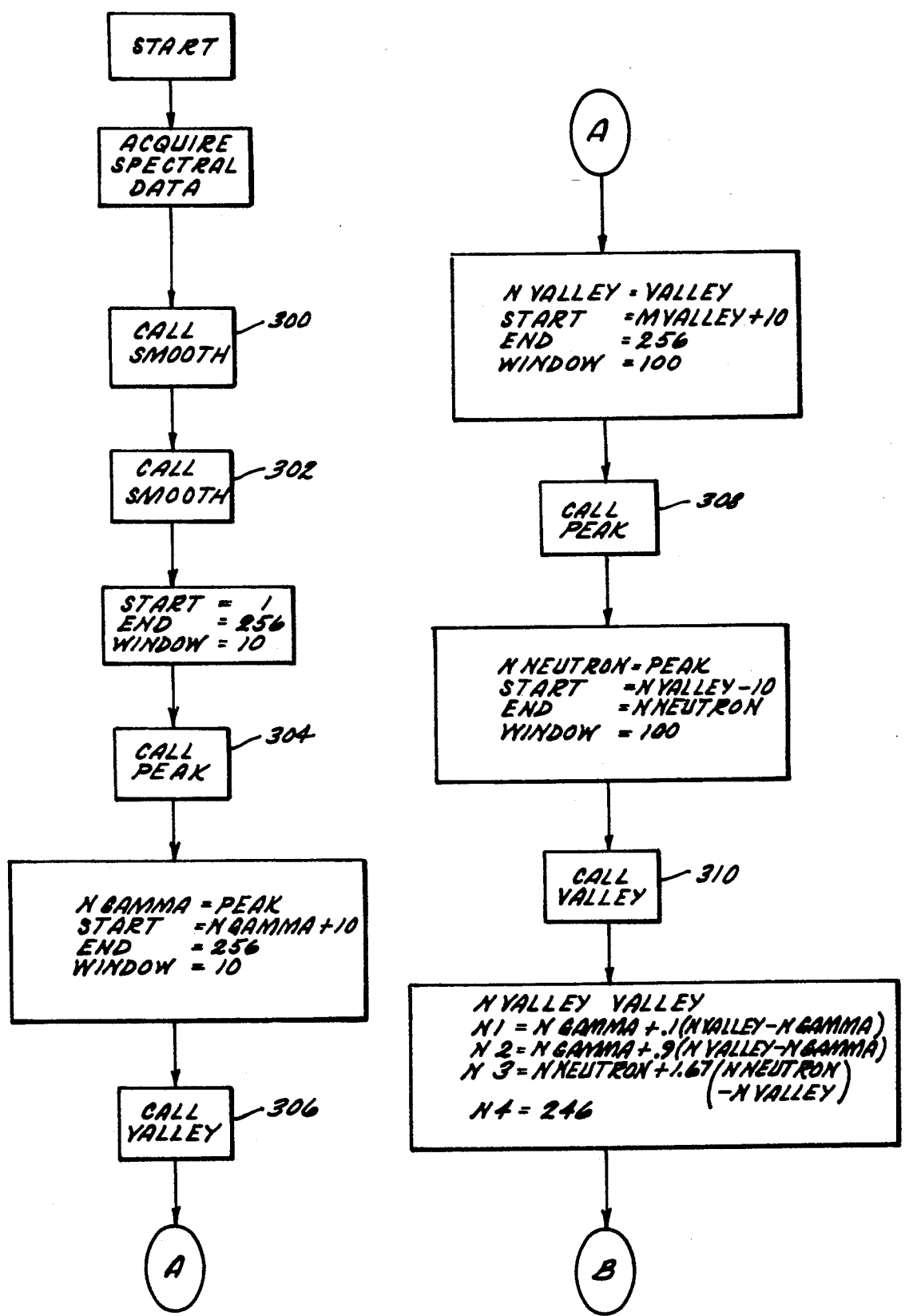

Next, the search for the valley between the gamma ray peak and the neutron peak is made using the VALLEY routine (at 306 in FIG. 4A). Starting at channel (NGAMMA +10), a search is made using the ten channel window and looking for the lowest count. When the lowest count is found, the window is shifted so that the first channel of the window corresponds to this lowest count. The process continues until the channel number found having the lowest count does not change and NVALLEY1 is the result. It should be noted that because of the shape of the spectrum, the VALLEY routine would not mistakenly find the valley in the region beyond the neutron peak.

The neutron peak is found by using the PEAK routine (at 308 in FIG. 4A) in a manner which follows. A search is made from (NVALLEY1+10) through channel 256 using a 100 channel window to find the channel with the highest count. The search is then repeated with the window shifted so that the first channel of the window corresponds to the channel with the highest count previously found. This process continues until this peak channel number does not change and the result is NNEUTRON.

Lastly, a search is made for a revised valley between the gamma peak and the neutron peak using the VALLEY routine (at 310 in FIG. 4A). This procedure amounts to a check on the initial value NVALLEY1 with the result being called NVALLEY. Using a 100 channel window, a search is made from channel (NVALLEY1-10) through channel 256 for the lowest count. When the lowest count is found, the window is shifted so that the first channel of the window corresponds to this lowest count. The process continues until the channel number having the lowest count no longer changes and NVALLEY is the result.

Having evaluated the shape of the curve which includes both neutron and gamma ray peaks, it now becomes possible to separate out the portions of the curve due to each. To do this, a first estimate of the gamma ray background is made using a procedure to be described. It is known from other considerations that the gamma ray background will be that of a decaying exponential curve. Such a decaying exponential curve can be written in the form $$Y = A(X^B) \quad (1)$$

where A and B are two parameters to be fitted to this curve by a least square fitting routine and X is the channel number. If logarithms of both sides of (1) are taken, then (1) becomes:

$$\log Y = \log A + B(\log X) \quad (2)$$

the equation for a straight line. Using a software routine known as LLSFIT (at 312 in FIG. 4B), a least square fit to a straight line is made such that the line is constrained to pass through the following four points:

N1 = NGAMMA + 0.1(NVALLEY − NGAMMA)

N2 = NGAMMA + 0.9(NVALLEY − NGAMMA)

N3 = NNEUTRON + 1.67(NNEUTRON − NVALLEY), but if N3 is greater than 226, then N3 = 216 and N4 = 246. The choice of the four points is not totally arbitrary but is based on experience and experiment. The LLSFIT routine 312 replots smoothed spectrum as log (channel) vs. log (counts), and fits a straight line constrained to pass through points N1, N2, N3 and N4. Linear fit is described with a slope = A and an intercept = B.

The background gamma ray curve so derived is then subtracted channel by channel between channels N1 and N4 inclusive from the previously smoothed spectrum. This subtraction is performed using a software routine known as BCKGRND (at 314 in FIG. 4B). The BCKGRND routine substrate the fit curve described in LLSFIT from the smoothed spectrum. The resultant curve represents a stripped spectrum with the exception of the hydrogen absorption peak.

PART III. In this part a Gaussian curve is fit to the neutron peak. It is known that the neutron ray curve will be that of a Gaussian curve. Such a Gaussian curve can be written in the following form:

$$y = ae^{-bx^2}$$

where:
a is the amplitude (AMP) at the neutron peak;
$b = 1/(2(SIGMA)^2)$;
SIGMA is the standard deviation about the neutron peak; and x is the channel number.

Defining a Gaussian curve (at 316 in FIG. 4B) to fit the neutron curve (i.e., NNEUTRON) can be accomplished by the following software commands:

```
sxi:=0; m:=nneutron; n:=15; nl:=2*n+1;
  sxiyi:=0.0; sxi2:=0; syi:=0.0; coef_a:=cnet[m]/sqr(nsm);
  {Fitting just for sigma, amplitude = height at centroid}
  For o:=m−n to m+n do begin
  p:=sqr(o−m);
  sxiyi:=sxiyi + p*ln(cnet[o]/cnet[m]);
  sxi:=sxi+p;
  sxi2:=sxi2+p*p;
  end;
  coef_b=−sxiyi/sxi2;
  sig:=sqrt (0.5/coef_b);
  counts:=coef_b*sig*2.5066; { 2.5066=sqrt(2*pi) }
``` which uses fifteen points about each side of the neutron peak to define a Gaussian curve fit for SIGMA. These commands also calculate SIGMA at channel NNEUTRON (at 318 in FIG. 4B) and then determine neutron counts (i.e., COUNTS) (at 320 in FIG. 4B) found by solving the following equation:

$$COUNTS = \sqrt{2\pi}(AMP)(SIGMA)$$

Alternatively, the Gaussian curve can be fit for both SIGMA and amplitude (AMP) as set forth below:

```
{Fitting for both sigma and amplitude}
For o:= m−n to m+n do begin
p:=sqr (o−m);
sxiyi:=sxiyi + p*ln(cnet[o]/sqr(nsm));
syi:=syi+ln(cnet[o]/sqr(nsm));
sxi:=sxi+p;
sxi2:=sxi2+p*p;
end;
det:=nl*sxi2−sxi*sxi;
coef_b=−(nl*sxiyi−sxi*syi)/det;
if coef_b =0. then
writeln ('Very poor fit');
coef_a:=(sxi2*syi−sxi*sxiyi)/det;
* mag:=exp(coef_a);
sig:=sqrt(0.5/coef_b);
counts:=mag*sig*2.5066;
```

For each acquisition, the above-described processing is done separately for the near and far detector.

This processing results in a neutron count which does not include the hydrogen absorption peak. This is unlike the processing of USSN 710,822 described hereinbefore. The process of USSN 710,822 did not fit a Gaussian curve to the neutron peak, although it was acknowledged therein that the neutron peak generally follows a Gaussian curve. Further, the processing of USSN 710,822 required two passes in order to obtain satisfactory results. It will be appreciated that the present invention can employ other stripping techniques and the above described exponential curve method is only exemplary. A comparison of the error factor of the present invention and the process of USSN 710,822 is set out forth below in TABLE 1:

TABLE 1

| TANK | NEUTRON COUNTS | | ERROR | | % IMPROVEMENT IN ERROR ((ERROR U.S. Ser. No. 710,822) - (ERROR PRESENT INVENTION)) / (ERROR U.S. Ser. No. 710,822) |
|---|---|---|---|---|---|
| | U.S. Ser. No. 710,822 | PRESENT INVENTION | U.S. Ser. No. 710,822 | PRESENT INVENTION | |
| 1 | 18986 | 19424 | 152 | 148 | 3 |
| 2 | 4143 | 4271 | 101 | 76 | 25 |
| 3 | 1445 | 1455 | 94 | 47 | 50 |
| 4 | 3791 | 3933 | 113 | 77 | 32 |
| 5 | 2686 | 2752 | 98 | 75 | 23 |
| 6 | 1716 | 1731 | 100 | 48 | 52 |
| 7 | 1876 | 1898 | 105 | 54 | 49 |
| 8 | 14231 | 14672 | 131 | 132 | −1 |
| 9 | 936 | 862 | 102 | 40 | 47 |

The composition of each tank is set forth below in TABLE 2:

TABLE 2

| TANK | COMPOSITION |
| --- | --- |
| 1 | Quartz |
| 2 | Limestone with 14.4% water |
| 3 | Limestone with 40.4% water |
| 4 | Limestone with 16.8% water |
| 5 | Limestone with 18.2% water |
| 6 | Limestone with 33.7% water |
| 7 | Limestone with 32.6% water |
| 8 | Pure Limestone |
| 9 | Pure Water |

In general, the present invention provides a significant improvement in the accuracy of the neutron counts, as can be seen from the above tables. However, for the tank containing quartz the improvement was minor and for the tank containing pure limestone, the process of USSN 710,822 provided marginally better results. This is due to the fact that the tank containing quartz and the tank containing pure limestone have little or no hydrogen present and, therefore, there is little or no hydrogen absorption peak present.

Figure 5:
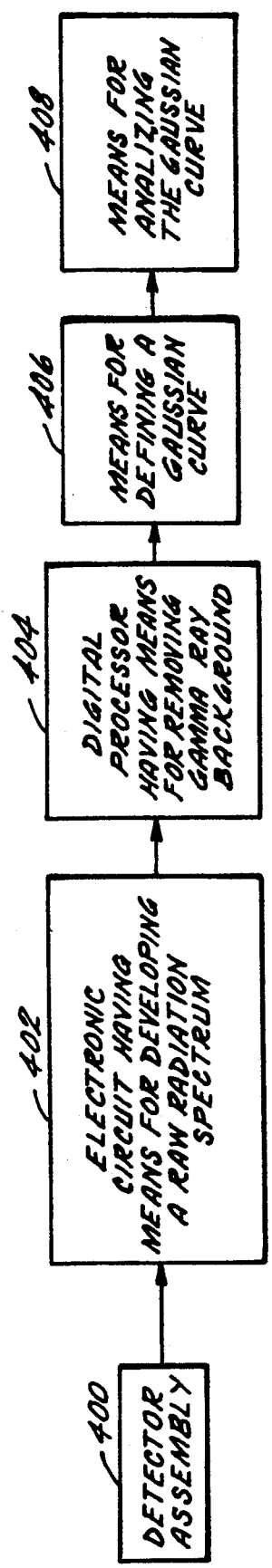
FIG. 5 is a block diagram of the electronics of the nuclear logging tool in accordance with the present invention.
Figure 6:
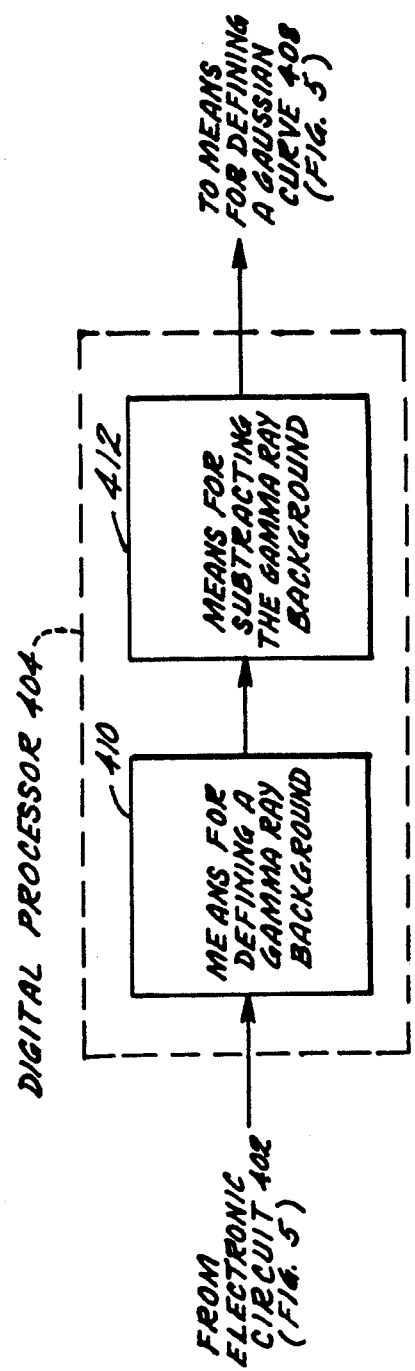
FIG. 6 is a block diagram of the digital processor of FIG. 5.

Referring to FIGS. 5 and 6, in summary a detector assembly 400 communicates with an electronic circuit having means for developing a raw radiation spectrum 402. The raw radiation spectrum is presented to a digital processor having means for removing gamma ray background 404. A Gaussian curve is then defined for the gamma ray stripped spectrum at 406 and analyzed at 408. Digital processor 404 includes means for defining a gamma ray background 410 and means for subtracting the gamma ray background 412. The above having been more fully described hereinbefore.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A nuclear logging apparatus for logging a borehole formation comprising:
   a drill collar sub;
   a radioactive source in said sub;
   at least one lithium detector assembly in said sub, said at least one detector assembly being spaced form said radioactive source and said at least one detector assembly being positioned to detect radiation resulting from neutrons emitted by said source;
   electronic circuit means communicating with said at least one detector assembly, said electronic circuit means including microprocessor means for analyzing radiation detected by said at least one detector assembly and providing a nuclear log of a borehole formation;
   wherein said electronic circuit means develop a raw radiation spectrum based on input from said at least one detector assembly, said raw radiation spectrum including a gamma ray background and a hydrogen absorption peak based on detected gamma rays and a neutron peak based on detected neutrons; and
   digital processing means for removing the gamma ray background from said raw spectrum to define a stripped spectrum, said stripped spectrum includes the hydrogen absorption peak and the neutron peak, said digital processing means including;
   means for defining a Gaussian curve indicative of a neutron ray contributed spectrum portion of said stripped spectrum.

2. The apparatus of claim 1 wherein said digital processing means further includes:
   means for defining a gamma ray background contributed spectrum portion by fitting a stripping curve to said raw spectrum the approximates the background portion of said raw spectrum which has been contributed by gamma rays; and
   means for subtracting the gamma ray background contributed spectrum portion from said raw spectrum to produce said stripped spectrum.

3. The apparatus of claim 2 wherein said digital processing means further includes:
   means for smoothing said raw radiation spectrum prior to fitting said stripping curve.

4. The apparatus of claim 1 wherein said digital processing means further includes:
   means for analyzing said Gaussian curve to yield the number of neutrons detected by said at least one detector assembly per unit of time.

5. The apparatus of claim 2 wherein said stripping curve is an exponential curve.

6. The apparatus of claim 1 wherein:
   said at least one lithium detector assembly includes $Li^6I$ crystal.

7. The apparatus of claim 1 wherein:
   said at least one lithium detector assembly includes $Li^6$ doped glass.

8. A nuclear logging method for logging a borehole formation using a logging tool comprising a drill collar sub, a radioactive source in said sub, at least one detector assembly in said sub, said at least one detector assembly being spaced from said radioactive source and said at least one detector assembly being positioned to detect radiation resulting from neutrons emitted by said source, and electronic circuit means communication with said at least one detector assembly, said electronic circuit means including microprocessor means for analyzing radiation detected by said at least one detector assembly and providing a nuclear log of a borehole formation, the method including the steps of:
   forming said at least one detector assembly from lithium;
   developing a raw radiation spectrum based on input from said at least one detector assembly, said raw radiation spectrum including a gamma ray background and a hydrogen absorption peak based on detected gamma rays and a neutron peak based on detected neutrons;
   removing the gamma ray background form said raw spectrum to define a stripped spectrum, said stripped spectrum includes the hydrogen absorption peak and the neutron peak; and
   defining a Gaussian curve indicative of a neutron ray contributed spectrum portion of said stripped spectrum.

9. The method of claim 8 wherein digital processing is used to obtain said stripped spectrum, said digital processing including:
   defining a gamma ray background contributed spectrum portion by fitting a stripping curve to said raw spectrum that approximates the background portion of said raw spectrum which has been contributed by gamma rays; and subtracting the gamma ray background contributed spectrum portion from said raw spectrum to produce said stripped spectrum.

10. The method of claim 9 including:
smoothing said raw radiation spectrum prior to fitting said stripping curve.

11. The method of claim 8 wherein said digital processing means further comprises:
analyzing said Gaussian curve to yield the number of neutrons detected by said at least one detector assembly per unit of time.

12. The method of 9 wherein said stripping curve is an exponential curve.

13. The method of claim 8 wherein:
said at least one lithium detector assembly includes $Li^6$ crystal.

14. The method of claim 8 wherein:
said at least one lithium detector assembly includes $Li^6$ doped glass.

15. A nuclear logging method for logging a borehole formation using a logging tool comprising a drill collar sub, a radioactive source in said sub, at least one detector assembly in said sub, said at least one detector assembly being spaced from said radioactive source and said at least one detector assembly being positioned to detect radiation resulting from neutrons emitted by said source, and electronic circuit means communication with said at least one detector assembly, said electronic circuit means including microprocessor means for analyzing radiation detected by said at least one detector assembly and providing a nuclear log of a borehole formation, the method including the step of: developing a raw radiation spectrum based on input from said at least one detector assembly, said raw radiation spectrum including a gamma ray background and a hydrogen absorption peak based on detected gamma rays and a neutron peak based on detected neutrons;
removing the gamma ray background from said raw spectrum to define a stripped spectrum; and
defining a Gaussian curve indicative of a neutron ray contributed spectrum portion of said stripped spectrum.

16. The method of claim 15 wherein digital processing is used to obtain said stripped spectrum, said digital processing including:
defining a gamma ray background contributed spectrum portion by fitting a stripping curve to said raw spectrum that approximates the background portion of said raw spectrum which has been contributed by gamma rays; and
subtracting the gamma ray background contributed spectrum portion from said raw spectrum to produce said stripped spectrum.

17. The method of claim 16 wherein said stripping curve is an exponential curve.

18. The method of claim 16 including:
smoothing said raw radiation spectrum prior to fitting said stripping curve.

19. The method of claim 16 wherein said digital processing means further comprises:
analyzing said Gaussian curve to yield the number of neutrons detected by said at least one detector assembly per unit of time.

20. A nuclear logging method for logging a borehole formation using a logging tool comprising a drill collar sub, a radioactive source in said sub, at least one detector assembly in said sub, said at least one detector assembly being spaced from said radioactive source and said at least one detector assembly being positioned to detect radiation resulting from neutrons emitted by said source, and electronic circuit means communication with said at least one detector assembly, said electronic circuit means including microprocessor means for analyzing radiation detected by said at least one detector assembly and providing a nuclear log of a borehole formation, comprising:
means for developing a raw radiation spectrum based on input from said at least one detector assembly, said raw radiation spectrum including a gamma ray background and a hydrogen absorption peak based on detected gamma rays and a neutron peak based on detected neutrons;
means for removing the gamma ray background from said raw spectrum to define a stripped spectrum; and
means for defining a Gaussian curve indicative of a neutron ray contributed spectrum portion of said stripped spectrum.

21. The apparatus of claim 20 wherein digital processing means is used to obtain said stripped spectrum, said digital processing means including:
means for defining a gamma ray background contributed spectrum portion by fitting a stripping curve to said raw spectrum that approximates the background portion of said raw spectrum which has been contributed by gamma rays; and
means for subtracting the gamma ray background contributed spectrum portion from said raw spectrum to produce said stripped spectrum.

22. The apparatus of claim 21 wherein said stripped curve is an exponential curve.

23. The apparatus of claim 21 including:
means for smoothing said raw radiation spectrum prior to fitting said stripped curve.

24. The apparatus claim 21 wherein said digital processing means further comprises:
means for analyzing said Gaussian curve to yield the number of neutrons detected by said at least one detector assembly per unit of time.

* * * * *